US009031123B2

(12) United States Patent
de Victoria (10) Patent No.: US 9,031,123 B2
(45) Date of Patent: May 12, 2015

(54) COMMUNICATION SYSTEM AND METHOD USING SUBSPACE INTERFERENCE CANCELLATION

(71) Applicant: Fernando Lopez de Victoria, San Francisco, CA (US)

(72) Inventor: Fernando Lopez de Victoria, San Francisco, CA (US)

(73) Assignee: Acorn Technologies, Inc., Santa Monica, CA (US)

( * ) Notice: Subject to any disclaimer, the term of this patent is extended or adjusted under 35 U.S.C. 154(b) by 0 days.

(21) Appl. No.: 13/835,659

(22) Filed: Mar. 15, 2013

(65) Prior Publication Data

US 2014/0269880 A1 Sep. 18, 2014

(51) Int. Cl.
*H03H 7/30* (2006.01)
*H04L 1/00* (2006.01)
*H04L 25/02* (2006.01)

(52) U.S. Cl.
CPC ........... *H04L 1/0038* (2013.01); *H04L 25/0212* (2013.01); *H04L 25/0232* (2013.01); *H04L 25/0246* (2013.01)

(58) Field of Classification Search
CPC ............... H04B 7/0413; H04B 1/7107; H04B 1/71072; H04B 7/0452; H04B 1/7115; H04B 2001/71077; H04B 7/0684; H04B 15/00; H04B 17/006; H04L 5/0048; H04L 27/2613; H04L 25/0242; H04L 25/03006; H04L 5/0007; H04L 1/0038; H04L 25/0212; H04L 25/0232; H04L 25/0246
USPC ......... 375/231, 229, 230, 260, 262, 267, 295, 375/316
See application file for complete search history.

(56) References Cited

U.S. PATENT DOCUMENTS

| 6,219,334 | B1 | 4/2001 | Sato et al. |
| 7,039,136 | B2 * | 5/2006 | Olson et al. .................. 375/346 |
| 7,099,270 | B2 | 8/2006 | Yamaguchi |
| 7,289,049 | B1 | 10/2007 | Fudge et al. |
| 7,394,876 | B2 | 7/2008 | Sestok, IV et al. |
| 7,609,616 | B2 | 10/2009 | Jacobsen |
| 7,639,738 | B2 | 12/2009 | Lopez de Victoria |

(Continued)

FOREIGN PATENT DOCUMENTS

CN 101127753 A 2/2008
JP 2007-515899 6/2007

(Continued)

OTHER PUBLICATIONS

WO, International Search Report, International Appln. No. PCT/US2012/062094, Mar. 25, 2013.

(Continued)

*Primary Examiner* — Dhaval Patel
(74) *Attorney, Agent, or Firm* — Orrick Herrington & Sutcliffe LLP (57) ABSTRACT

A receiver performs interference mitigation under blind or semi-blind conditions using diversity present in the signal of interest or in the interferer. A first path interference mitigation procedure extracts training information from received signals, performs interference mitigation on the training information and estimates the channel. The second path interference mitigation procedure uses data extracted from the received signal and the channel estimate to perform interference mitigation. Each interference mitigation process can take the form of a lossy compression followed by decompression.

29 Claims, 7 Drawing Sheets

(56) References Cited

U.S. PATENT DOCUMENTS

| | | | |
|---|---|---|---|
| 7,697,412 B2 | 4/2010 | Anderson et al. | |
| 7,697,449 B1 | 4/2010 | Shirali et al. | |
| 7,787,572 B2 | 8/2010 | Scharf et al. | |
| 7,848,463 B2 | 12/2010 | Li et al. | |
| 7,995,688 B2 | 8/2011 | Hong et al. | |
| 8,611,311 B2 * | 12/2013 | Coralli et al. | 370/335 |
| 2004/0219883 A1 | 11/2004 | Pauli et al. | |
| 2005/0075845 A1 | 4/2005 | Thomas et al. | |
| 2005/0147026 A1 | 7/2005 | Jones, IV et al. | |
| 2005/0180364 A1 | 8/2005 | Nagarajan et al. | |
| 2006/0029279 A1 | 2/2006 | Donoho | |
| 2006/0153283 A1* | 7/2006 | Scharf et al. | 375/148 |
| 2006/0291578 A1 | 12/2006 | Singh et al. | |
| 2008/0117995 A1 | 5/2008 | Anderson et al. | |
| 2008/0130771 A1 | 6/2008 | Fechtel et al. | |
| 2008/0151989 A1 | 6/2008 | Von Elbwart et al. | |
| 2008/0228446 A1* | 9/2008 | Baraniuk et al. | 702/189 |
| 2010/0002788 A1 | 1/2010 | Wu et al. | |
| 2010/0195774 A1 | 8/2010 | Lopez de Victoria | |
| 2010/0272194 A1 | 10/2010 | Zhengang et al. | |
| 2010/0284478 A1 | 11/2010 | Liao et al. | |
| 2011/0069796 A1 | 3/2011 | Scharf et al. | |
| 2011/0096767 A1 | 4/2011 | Narayan et al. | |
| 2011/0122789 A1 | 5/2011 | Haustein et al. | |
| 2011/0142118 A1 | 6/2011 | Seo et al. | |

FOREIGN PATENT DOCUMENTS

| | | |
|---|---|---|
| JP | 2008-536359 | 9/2008 |
| JP | 2009-081535 | 4/2009 |
| WO | WO 2007/149297 A1 | 12/2007 |
| WO | WO 2008/136184 | 11/2008 |
| WO | WO 2010/090787 A1 | 8/2010 |
| WO | WO 2011/066271 | 6/2011 |

OTHER PUBLICATIONS

Jia, et al., "Improved Channel Estimation Method Based on Time-Domain Processing for OFDM Systems", *Wireless Communications, Networking and Mobile Computing, IEEE International Conference*, pp. 13-16 (Sep. 21, 2007).
Lin, et al., "A Novel Channel Estimation Method Using Virtual Pilots in MIMO OFDM Systems", *IEICE Transactions on Communications*, E91-B(11):3764-3767 (Nov. 2008).
Sun, et al., "A Time Domain Iteration-based Channel Estimation Method in OFDM System with Null Subcarriers", *2010 IEEE Vehicular Technology Conference*, pp. 1-5 (May 16-19, 2010).
Werner, et al., "Low-Complexity Time-Domain Channel Estimators for Mobile Wireless OFDM Systems", *Proc. IEEE Workshop on Signal Processing System Design and Implementation, IEEE*, pp. 245-250 (Nov. 2, 2005).
Werner, et al., "Combined Frequency and Time Domain Channel Estimation in Mobile MIMO-OFDM Systems", *2006 IEEE International Conference on Toulouse, France*, p. IV373-IV376 (May 14-19, 2006).
Abari, et al., "Low complexity channel estimation for LTE in fast fading environments for implementation on multi-standard platforms," IEEE, Vehicular Technology Conference, Sep. 6-9, 2010, pp. 1-5.
Arslan, et al., "Interference mitigation and awareness for improved reliability," Reliable Communications for Short-range Wireless Systems, 2011, pp. 190-233, Cambridge University Press, United Kingdom.
Berger, et al., "Sparse Channel Estimation for Multicarrier Underwater Acoustic Communication: From Subspace Methods to Compressed Sensing," IEEE, Signal Processing, Mar. 2010, pp. 1708-1721, vol. 58, Issue 3.
Berger, et al., "Sparse Channel Estimation for OFDM: Over-Complete Dictionaries and Super-Resolution," IEEE Signal Processing Advances in Wireless Communications, 2009, Jun. 21-24, 2009, pp. 196-200.
Blumensath, et al. "Gradient Pursuits," IEEE, Signal Processing, Jun. 2008, pp. 2370-2382, vol. 56, Issue 6.
Budiarjo, et al., "On the Use of Virtual Pilots with Decision Directed Method in OFDM Based Cognitive Radio Channel Estimation Using 2x1-D Wiener Filter," IEEE, Communications, May 19-23, 2008, pp. 703-707.
Candes, "Compressive sampling," Proceedings of the International Congress of Mathematicians, 2006, pp. 1-20, Madrid, Spain.
De Baynast, et al., "Chip-level LMMSE Equalization for Downlink MIMO CDMA in Fast Fading Environments," IEEE Global Telecommunications Conference, Nov. 29-Dec. 3, 2004, pp. 2552-2556, vol. 4.
Doukopoulos, et al., "Robust Channel Estimation via FFT Interpolation for Multicarrier Systems," IEEE, Vehicular Technology Conference, Apr. 22-25, 2007, pp. 1861-1865.
Edfors, et al. "Analysis of DFT-Based Channel Estimators for OFDM," Wireless Personal Communications, 2000, pp. 55-70, vol. 12.
Edfors, et al., "OFDM Channel Estimation by Singular Value Decomposition," IEEE Communications, Jul. 1998, pp. 931-939, vol. 46, Issue 7.
Fornasier, et al., "Compressive Sensing," Apr. 18, 2010, pp. 1-49.
Haimovich, et al. "An Eigenanalysis Interference Canceler," Jan. 1991, vol. 39, No. 1.
Hoeher, et al., "Two-Dimensional Pilot-Symbol-Aided Channel Estimation by Wiener Filtering," IEEE, Acoustics, Speech, and Signal Processing, Apr. 21-24, 1997, pp. 1845-1848, vol. 3.
Huang, et al., "Kalman-filter-based channel estimation for orthogonal frequency-division multiplexing systems in time-varying channels," IET, Communications, Aug. 2007, pp. 795-801, vol. 1, Issue 4.
Kinjo, "Time domain channel estimation schemes for OFDM systems with multiple antenna transmissions," IEEE, Intelligent Signal Processing and Communication Systems, Jan. 7-9, 2009, pp. 232-235.
Le Saux, et al., "Robust Time Domain Channel Estimation for Mimo-OFDMA Downlink System," Electrical Engineering, 2007, pp. 357-366, vol. 1.
Maechler, et al., "Implementation of Greedy Algorithms for LTE Sparse Channel Estimation" Signals, Systems and Computers (ASILOMAR), Nov. 7-10, 2010, pp. 400-405.
Maechler, et al., "Matching Pursuit: Evaluation and Implementation for LTE Channel Estimation," IEEE, Circuits and Systems (ISCAS), May 30-Jun. 2, 2010, pp. 589-592.
Mallat, et al., "Matching Pursuits With Time-Frequency Dictionaries," IEEE, Signal Processing, Dec. 1993, pp. 3397-3415, vol. 41, Issue 12.
Özbek, et al., "Pilot-Symbol-Aided Iterative Channel Estimation for OFDM-Based Systems".
Ozdemir, et al. "Channel Estimation for Wireless OFDM Systems," IEEE Communications, 2007, pp. 18-48, vol. 9, No. 2.
Pati, et al., "Orthogonal Matching Pursuit: Recursive Function Approximation with Applications to Wavelet Decomposition," Signals, Systems and Computers, Nov. 1-3, 1993, pp. 40-44, vol. 1.
Rinne, et al, "Pilot Spacing in Orthogonal Frequency Division Multiplexing Systems on Practical Channels," IEEE, Consumer Electronics, Nov. 1996, pp. 959-962, vol. 42, Issue 4.
Saeed, et al., "MIMO OFDM Channel Estimation Based on RLS Algorithm: the Time-versus Frequency-domain Implementations," Communications, 2007. Asia-Pacific Conference on Communications, Oct. 18-20, 2007, pp. 547-550.
Schafhuber, et al., "Adaptive Wiener Filters for Time-Varying Channel Estimation in Wireless OFDM Systems," IEEE, Acoustics, Speech and Signal Processing, Apr. 6-10, 2003, pp. 688-691, vol. 4.
Taubock, et al., "A Compressed Sensing Technique for OFDM Channel Estimation in Mobile Environments: Exploiting Channel Sparsity for Reducing Pilots," IEEE, Acoustics, Speech and Signal Processing, Mar. 31-Apr. 4, 2008, pp. 2885-2888.
Van De Beek, et al. "On Channel Estimation in OFDM Systems," Vehicular Technology Conference, Jul. 25-27, 1995, pp. 815-819, vol. 2.
Wan, et al., "The Modified Iterative Detector/Estimator Algorithm for Sparse Channel Estimation," OCEANS 2010, Sep. 20-23, 2010, pp. 1-6.

(56) References Cited

OTHER PUBLICATIONS

Wang, et al., "A New Channel Estimation Method Based on Distributed Compressed Sensing," IEEE, Wireless Communications and Networking Conference, Apr. 18-21, 2010, pp. 1-4.

Wu, et al., "Channel Estimation for OFDM Systems with Subspace Pursuit Algorithm," ICGCS, Green Circuits and Systems, Jun. 21-23, 2010, pp. 269-272.

Yucek, et al., "A Comparative Study of Initial Downlink Channel Estimation Algorithms for Mobile WiMAX," IEEE, Xplore Digital Library, Mar. 25-29, 2007, pp. 32-37.

Zhao, et al., "A Novel Channel Estimation Method for OFDM Mobile Communication Systems Based on Pilot Signals and Transform-Domain Processing," IEEE $47^{th}$ Vehicular Technology Conference, May 4-7, 1997, pp. 2089-2093, vol. 3.

WO, International Search Report, Application No. PCT/US2014/019656, May 14, 2014.

Simeone, et al., "Pilot-Based Channel Estimation for OFDM Systems by Tracking the Delay-Subspace", *IEEE Trans. on Wireless Comm.*, 3(1):315-325 (Jan. 1, 2004).

* cited by examiner

COMMUNICATION SYSTEM AND METHOD USING SUBSPACE INTERFERENCE CANCELLATION

BACKGROUND

1. Field of the Invention

The present invention generally relates to the field of signal processing and, in particular, relates to communication systems that mitigate interference through subspace interference cancellation with little or no knowledge of the characteristics of the interferer or interferers.

2. Description of the Related Art

Wireless receivers most commonly perform interference cancellation using multiple-antenna configurations that facilitate spatial diversity cancellation. Multiple-antenna receivers can "tune" to a small angle of arrival to attenuate interference arriving from other signal sources at different spatial angles.

Figure 1:
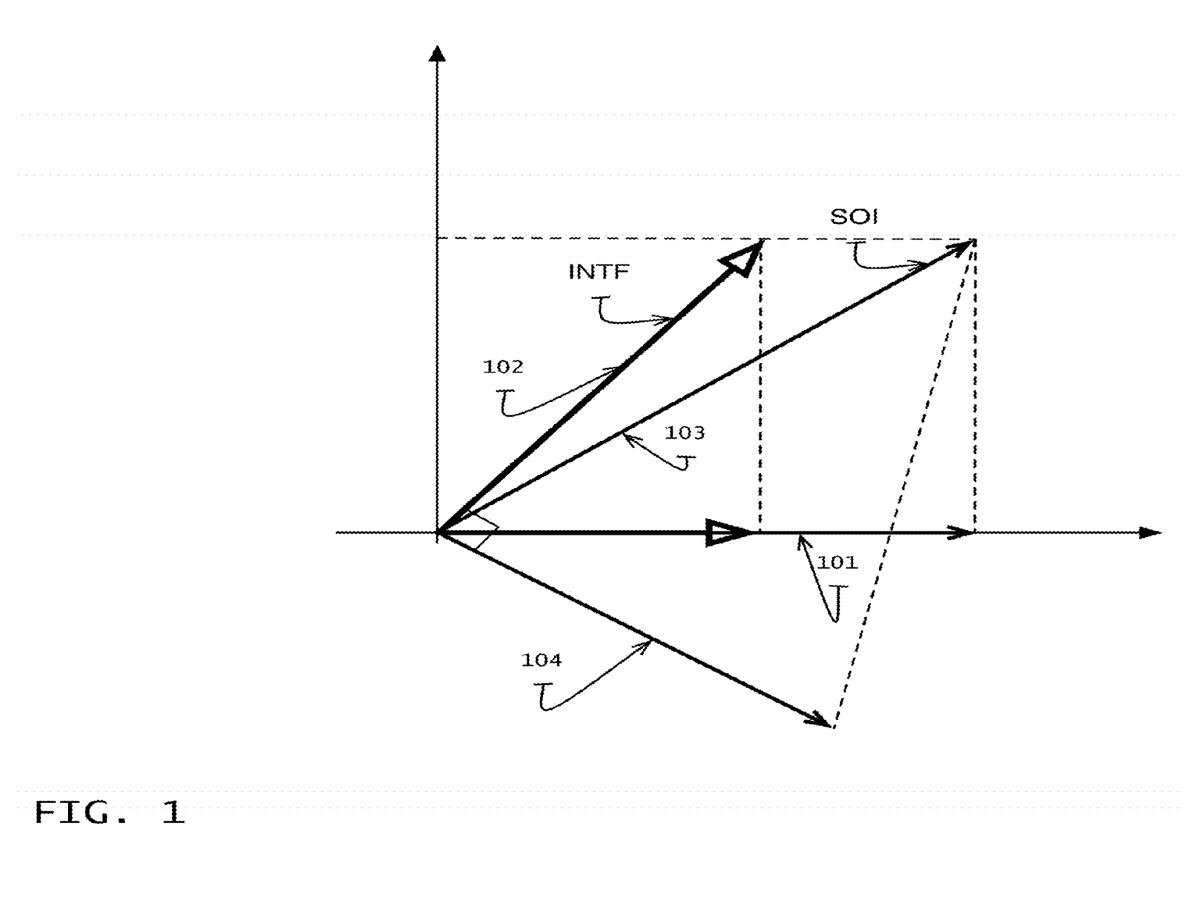
FIG. 1 illustrates the diversity between a signal of interest and an interfering signal represented within a two-dimensional space, and illustrates projection angles that might be adopted to mitigate interference.

Strategies for mitigating interference are illustrated in FIG. 1 by showing each received signal from each source as a two-dimensional vector based on two samples per symbol. FIG. 1 shows the signal of interest (SOI) 103 and an interferer 102. In a network that uses a multiple axis scheme to transmit information for multiple users within one symbol, interferers could be other users, other base stations or other noise sources including ones outside of the network.

Projections can be used to mitigate interference, for example by projecting a signal of interest onto a subspace that reduces the power of the SOI but reduces the power of the interferer to a greater extent. This would be the case of projecting the signal of interest 102 and the interferer 103 onto the vector 101. A different projection strategy uses knowledge about the interferer to project both the signal of interest and the interfering signal into a subspace that is orthogonal to the interferer. This subspace is noted by the vector 104 and, because it is at a right angle to the interfering signal vector 102, the resulting interference power should be zero while some signal power should be present in the projection of the signal of interest. Any projection or vector rotation is accomplished via a matrix multiplication.

Conventional communication networks have also used non-spatial-diversity-based interference cancellation methods to improve network capacity. These strategies depend on the receiver knowing the characteristics of the interferer or having system-wide knowledge of waveform properties. For example, a conventional interference cancellation strategy for code division multiple access (CDMA) systems relies on the receiver knowing all codes for the SOI and the interferers.

On the other hand, modern wireless standards as exemplified by the long term evolution (LTE) standard reduce inter-cell synchronization. For communication networks using the LTE or similar standards, there may not be a way to effectively characterize the significant interferers based on system-wide knowledge of waveform properties. Simultaneous deployment of various standards (GSM, LTE, WiMAX & WCDMA) in a geographical area may require a "blind interference" cancellation strategy, a strategy that can work when no information is known about the interferer, and may need to be applicable to many modulation waveform types. The term "blind interference cancellation" (BIC) typically is used to identify a scheme in which nothing is known about any interferer, while the term "semi-blind interference cancellation" (SBIC) typically is used to identify a scheme in which some information about at least the dominant interferer is known.

Conventional interference cancellation strategies have focused on CDMA wireless networks. Other modern communication networks may utilize orthogonal frequency division multiplexing (OFDM) waveforms. In both CDMA and OFDM networks, users are allocated orthogonal codes or frequencies. Another characteristic of these two networks is that a symbol, containing a burst of bits for the user, consists of a number of samples.

Despite many similarities between CDMA and OFDM protocols, their implementation in a wireless network differs greatly. In the case of CDMA, there is a system-wide timing synchronization (e.g., IS-95) and an inter-cell handling of a user's signal termed a "soft handoff." Because of these properties, the CDMA receiver will know the codes for nearby base stations, as well as the timing of those codes relative to each other. Conventional CDMA interference mitigation strategies exploit this knowledge to design an SBIC receiver to identify interference associated with known codes from non-SOI sources.

In contrast, an LTE network utilizes OFDM in a design that forgoes receiver knowledge of nearby base stations. Consequently, an interference mitigation strategy cannot rely solely on knowledge of the characteristics of interfering signals. Furthermore, an OFDM receiver typically performs a function not essential in CDMA receivers: channel estimation. That is, a CDMA receiver assigns rake-finger receivers to each of the dominant multi-paths in the channel's impulse response (CIR) without accounting for other aspects of the channel. In the case of OFDM, the receiver typically estimates the relevant CIR span to equalize the signal prior to demodulation and generally makes other use of the channel estimate. Demodulation is the operation in OFDM receivers that extracts the information bits intended for the user.

Four common scenarios in wireless communication are prominent enough to consider in evaluating strategies for interference cancellation. These four scenarios are: 1) uncooperative interferers; 2) similarly modulated interferers with unknown waveform properties; 3) similarly modulated interferers with known waveform properties; and 4) unknown spatial conditions which may result in single antenna conditions (e.g., "the death grip").

Scenario #1 refers to adjacent channel interferers. In wireless communication deployments with tight spectrum availability, there may be significant energy spilled from adjacent communication links that limit achievable performance. In such a case, the adjacent transmitter is said to be "uncooperative" since the receiver has no knowledge of the transmitter's transmission waveform properties. This geographically adjacent channel's transmitter can be assumed to be of a different waveform design, but uncooperative as to its waveform parameters.

The LTE standard increases network capacity through "intentional interference" resulting in interference scenario #2. In this scenario, termed HetNet in LTE, the interferer is modulated similarly to the desired or intended transmission, but conditions may be such that only this similarity is known. Information is not available to the receiver as to what specific parameters were used by the interfering station to create its waveform, if the symbols are synchronized to the same clock as the intended transmission, or if the symbols are of the same duration as the intended transmission.

Scenario #3 involves a network that achieves higher throughput to users through synchronized interference. In this scenario, the receiver knows some information about the interferer that can include certain of the interfering signal's waveform properties.

Scenario #4 relates to a loss of designed multiple antenna diversity. This scenario received popular attention when a so-called "death grip" on a smartphone reduced receiving performance. The multiple antenna configuration was such that a left-handed grip of the phone could lead to an effective single-antenna reception. More generally, "shadowing" by the hand or body can cause a similar loss of spatial diversity. In this scenario #4, a desirable interference cancellation scheme would work to sustain rates similar to those achievable with one antenna and no interferer.

SUMMARY OF THE PREFERRED EMBODIMENTS

An aspect of the present invention provides a method in an OFDM system including receiving a signal comprising at least one OFDM symbol. The method includes extracting training information from the OFDM symbol, performing interference mitigation on the extracted training information to produce reduced interference training information, and performing channel estimation using the reduced interference training information to produce a channel estimate. The method also includes equalizing at least a portion of the OFDM symbol using the channel estimate.

A further aspect of the invention performs a second interference mitigation process on at least a data portion of the OFDM symbol in response to the channel estimate. Still further, the second interference mitigation uses the channel estimate to generate a basis and, using the basis, perform lossy compression followed by decompression on at least a portion of the OFDM symbol.

DETAILED DESCRIPTION OF THE PREFERRED EMBODIMENTS

The systems and methods described here are relevant to the mitigation of interference in wireless networks. Aspects of this discussion can be applied advantageously in wired networks. Preferred receiver embodiments may be applied to either OFDM or CDMA modulated systems with a priori knowledge of interferers or in the absence of such knowledge about interferers, where the receiver may have one or multiple antennas.

Implementations of the present invention may achieve target operational signal-to-interference-and-noise ratios (SINRs) for currently deployed wireless standards, or any other communication system with prescribed waveform properties. A preferred strategy exploits transmitted diversities that are present in communication systems using wireless or wired channels. Modern systems generally utilize an orthogonal scheme to separate the users aggregated in any one transmitted symbol. Preferred strategies can utilize orthogonality and multi-dimensional symbols in the sample space to analyze and mitigate interference. Another type of diversity that can be used for interference mitigation is the channel over which each signal travels to reach the receiver. Using scenario #3 discussed above as an example, if the receiver has sufficient information to identify the channel of the interferer, for example by having knowledge of its modulated pilot frequencies and timing synchronization, then channel disparity in delay and amplitudes can be exploited as a form of diversity. Aspects of the present invention may exploit diversity in pilot frequencies and their (near) orthogonality at the receiver.

Preferred strategies provide matrix projectors that advantageously rotate and/or project vectors of a signal of interest (SOI) to best attenuate the aggregate interference, using relationships similar to those shown in FIG. 1 as vectors at angles to the SOI, even when information is not available about the interferer. The diversity exploited in this strategy is that the interferer is at some angular distance from the SOI as represented in the preferred vector space basis. This angular distance can be found via samples from a vector in the received signal, or other estimated parameters such as channel coefficients. No assumptions need to be made about the number of antennas in the receiver to utilize such projections.

Another preferred aspect of the present invention is to perform interference mitigation in a manner that can achieve reduced complexity. Generally a strategy that projects the signal of interest into a subspace orthogonal to the interference is computationally complex because such a strategy requires matrix inversion, which is not required in preferred implementations of the strategies described here.

A preferred strategy is used to find a subspace projection based on a projection matrix determined from information available at the receiver, where the receiver may be "blind" to the interference. For instance, a preferred form of diversity is the difference in channel impulse response (CIR) between the interferer and the signal of interest. On the other hand, the receiver may not have sufficient knowledge about the interferer to compute its CIR. Preferably then, the projection strategy is adapted to work with reduced information. The diversity strategy preferably can utilize, directly or indirectly, the orthogonality in modulation (frequency or code) and channel information by representing this information as vectors and using one or more of various strategies to determine an appropriate projection that sufficiently limits or minimizes the interference power.

Other strategies may provide projectors such as matrix projectors that advantageously rotate vectors of a signal of interest to a subspace where a known interferer has zero amplitude. Practically, the desired subspace may be one where the known interferer has sufficiently small amplitude as to be negligible in further processing. These strategies can be applied using transmitted waveform properties, such as training pilots or sequences, or other sources of time diversity, such as channel impulse responses for the known signals. Preferred strategies according to the present invention provide interference mitigation for OFDM systems that simultaneously improve time-domain channel estimation and improve signal-to-interference levels with high probability. Another aspect of the present invention can provide a solution to mitigate interference in CDMA systems that simultaneously considers known or unknown network and waveform parameters.

An effective cancellation strategy is one in which the interferer power level is reduced sufficiently to allow demodulation of the transmitted signal at the target bit error rate as if the interferer were not present. That is, rather than require a strategy that eliminates the interferer power to zero, a preferred strategy is to provide enough suppression to achieve an operational signal-to-noise ratio (SNR) for a choice of digital modulation or bit rate. Since the projection may not guarantee an absolute cancellation of the interferer, the term cancellation denotes achieving a targeted level of suppression of an interferer.

A preferred strategy applies matrix decomposition to known waveform parameters of the signal of interest and any known interferer based on a linear convolution representation for each of the known signals to determine the projection matrix that rotates the SOI to an advantageous subspace where interference is attenuated in a desired fashion.

Preferred implementations identify a source of diversity between received signals that exploits structures in some received signals that differ from corresponding structures in the signal of interest. Particularly preferred implementations use a projection related to a structure in received signals that has variations for each modulation type. Once the vectors for the SOI structure are identified, then the projection matrix can be constructed for a projection into the SOI, similar to what is shown in FIG. 1 with vector 101. When the receiver has information about the parameters for any non-SOI signal, such as for a signal similar to vector 102 shown in FIG. 1, the projection matrix preferably includes this non-SOI signal information to project the non-SOI signals into an orthogonal signal space, which is similar to the vector 104 shown in FIG. 1.

Figure 2:
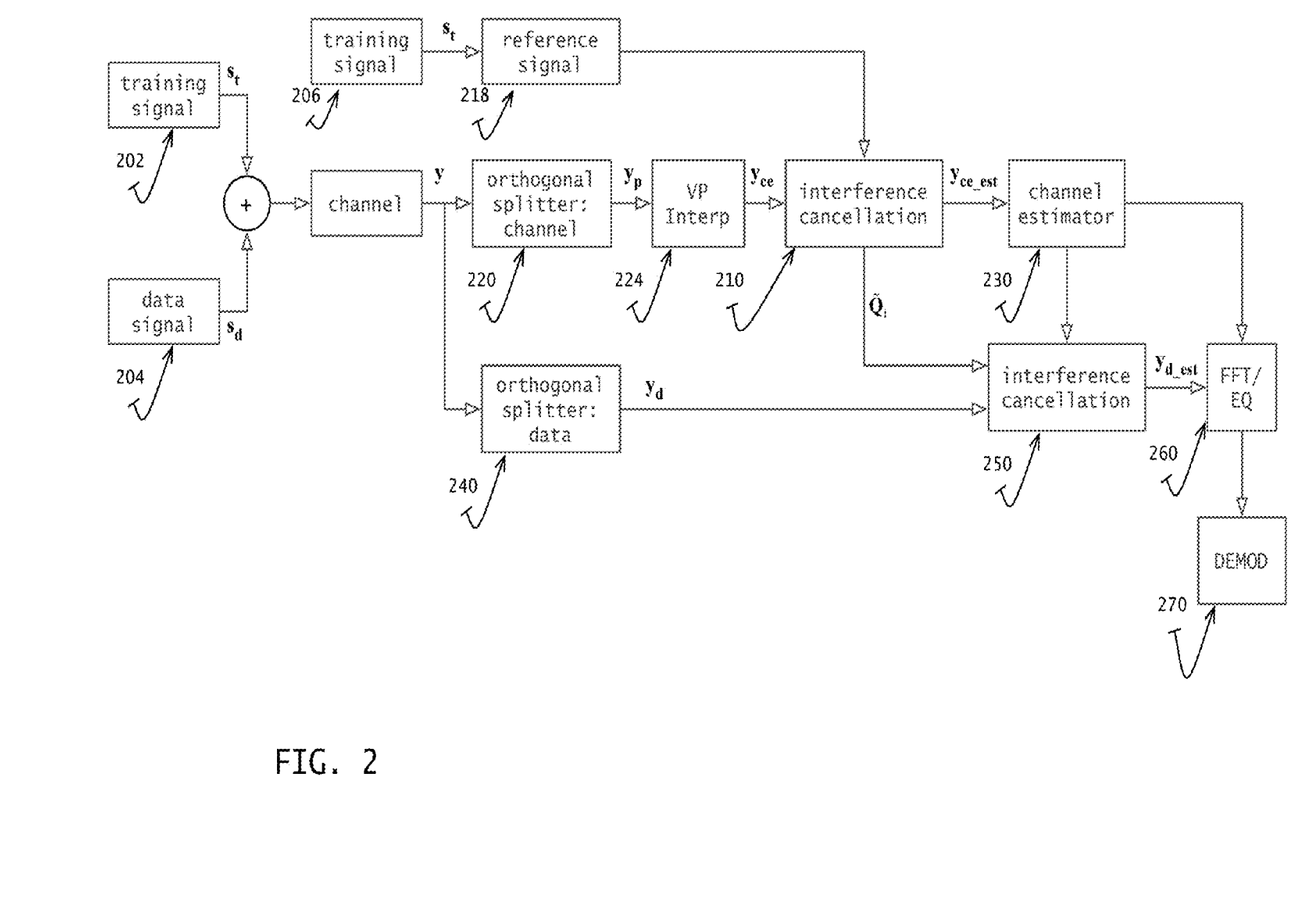
FIG. 2 illustrates a preferred system and method for interference cancellation for OFDM signals with known or unknown interferers as a two-part sequential approach with a channel estimator interference canceller followed by a data signal interference canceller.

Prevalent modern communication networks use waveforms consisting of symbols lasting a designed number of samples with the users coexisting in the symbol via orthogonal channels. In CDMA, the orthogonal channels are defined by spreading codes lasting a prescribed duration of samples. In OFDM the orthogonal channels are defined by a number of small bandwidth carriers. A preferred aspect of the present invention exploits these orthogonal channels to implement a two path interference suppression procedure. FIG. 2 shows a receiver that implements one form of two path interference suppression. The two paths arise from a division of the symbol y present at the input to the receiver into a pilot/training component including, for example, the information transmitted for channel estimation purposes ($y_{ce}$), and a second component consisting of the user(s) transmitted data ($y_d$). The FIG. 2 implementation exploits this signal splitting in a sequential two-step process for interference cancellation. The first step applies a preferred interference cancellation procedure to the channel estimation path. The second step applies a preferred interference cancellation procedure to the modulated signal path.

A single transmitted symbol is typically the summation of two types of channels: (1) training signal channels 202; and (2) data signal channels 204 as shown in FIG. 2. Training signals 202 and data signals are combined at the transmitter and provided over the channel to the receiver of FIG. 2. The number of training signal channels is chosen to keep the overhead usage to a designed level. In an LTE configuration, for example, two carriers or channels out of twelve carriers in a carrier grouping are pilot carriers used for training in a channel estimation procedure. Because these training and user data channel types are orthogonal, the training and data signals can be separated at the receiver if the orthogonality is preserved within a reasonable margin. Splitting the training signal channels from the data signal channels may be simple or may require some more sophisticated procedure, as illustrated in FIG. 2 with the orthogonal splitters 220 (training, pilots or channel) and 240 (data) that split the two signal types that may be embedded within any symbol.

In OFDM systems a channel estimator 230 processes the pilot carriers to identify the channel, with the processing typically performed in the frequency domain. The same order applies to CDMA systems, where the CDMA receiver first identifies the most powerful paths and estimates their channel to, for example, initialize the rake fingers of the receiver. Then, the identified channel is used to define an equalizer that the receiver applies to the data carriers 260. This is the case for OFDM or CDMA receivers. A preferred splitter 220 extracts the training components of the symbol to calculate its output channel estimation signal $y_{ce}$. This channel estimation symbol is processed to remove interference 210 for example by using the designed receiver functionality of perfectly reproducing the training signals from known information. Typically the FIG. 2 receiver stores information in a local memory about the training signal that is known a priori because the aspects of the training signal are dictated by standards. The FIG. 2 receiver determines a reference signal 218 from this training signal 206 and uses reference signal 218 in interference cancellation 210.

An OFDM receiver can estimate the channel impulse response (CIR) in the time domain, even though the most common strategy is for an OFDM receiver to calculate the channel frequency response (CFR). Time domain channel estimation (TDCE) is presently preferred since it facilitates an effective application of a preferred interference cancellation method to both OFDM and CDMA communication systems. TDCE is discussed, for example, in U.S. patent application Ser. No. 13/416,990, "OFDM Receiver with Time Domain Channel Estimation," filed Mar. 9, 2012, which application is incorporated in its entirety for its teachings with respect to OFDM receivers, time domain channel estimation and the determination and use of virtual pilots.

Referring again to FIG. 2, the orthogonal channel splitter outputs the signal $y_p$ to a virtual pilot interpolator 224 that adds virtual pilots to $y_p$ at prior data carrier locations to provide greater stability and improve the convergence of the interference cancellation process. Virtual pilots are pilot information derived at least in part from information about actual pilots. A further discussion of virtual pilots and their use is provided in the above-incorporated application and in the application Ser. No. 13/835,305, entitled "Block Time Domain Channel Estimation in OFDM System," filed Mar. 15, 2013 naming Steven C. Thompson and Fernando Lopez de Victoria as inventors, which application is incorporated here in its entirety for all purposes including for its discussion of time domain channel estimation.

Virtual pilot interpolator 224 preferably outputs the signal $y_{ce}$ that includes actual pilot information and virtual pilot information. The training signal interference canceller 210 performs interference cancellation in the manner described below with respect to FIG. 5 and outputs its interference mitigated training signal $y_{ce\_est}$ to the channel estimator 230, which determines a channel estimate, preferably using time domain channel estimation. The channel estimation may be performed in accordance with the estimation described in the two above-incorporated applications and is then transformed by a FFT prior to being used by the equalizer 260. Interference canceller also generates the basis $\tilde{Q}_1$ used in developing the compression projection of the symbol interference canceller 250. Interference canceller 250 performs interference cancellation on the received symbol preferably using the process flow illustrated in FIG. 7. Symbol interference canceller 250 outputs a data estimate $y_{d\_est}$ that is transformed by the FFT and then equalized with the channel estimate within the equalizer 260. The equalized and interference mitigated symbol is then demodulated to extract the data. This discussion now addresses the preferred interference cancellation starting with background on the strategy.

Linear system theory describes a received signal as a signal transmitted through a channel and modified by that channel. The relationship between the received signal, the transmitted signal and the channel can be expressed as a convolution, which has the matrix-vector representation, $$y=Hs+n \quad \text{EQ. 1}$$

where y is the received signal vector preferably comprising all the samples in one symbol. The vector n contains an equal number of noise samples and H is the convolution matrix containing the channel coefficients. The vector s contains the samples of a transmitted symbol. Because EQ. 1 is a linear equation, the terms can be written as, $$y=Sh+n \quad \text{EQ. 2}$$

The formulation of EQ. 2 has been exploited conventionally to identify the channel vector h using a transmitted training sequence in S. This strategy works with EQ. 2 as if no information is transmitted because S includes a set of signals known at the receiver through its training functionality. Training symbols consist of known values that can be replicated at the receiver to achieve, at a minimum, timing and carrier acquisition. In OFDM systems training symbols also include channel estimation information.

Although OFDM receivers use orthogonal carriers, OFDM signals can exhibit a loss of orthogonality due to channel multipath, doppler and carrier frequency offset at the receiver and so OFDM receivers are not as robust as CDMA receivers. Some preferred implementations provide interference mitigation for OFDM networks in part by identifying the active carriers for a given user. Consequently, the time-domain convolution matrix S in EQ. 2 is a preferred source for identifying some diversity against non-SOI signals. Fundamental kernels in the design of preferred interference mitigation strategies have a high overlap in their application to CDMA and OFDM receivers.

OFDM receivers have two principal functions: 1) to estimate the channel for equalization; and 2) to demodulate the received signal. The OFDM receiver knows the frequencies that are used for "pilot tones" and the frequencies used for "data tones." Time domain channel estimation for OFDM signals offers a variety of advantages in wireless networks. Further discussion of channel estimation, equalization and demodulation can be found in previously-incorporated U.S. patent application Ser. No. 13/416,990, "OFDM Receiver with Time Domain Channel Estimation." Channel estimation accuracy in OFDM systems is particularly desirable for robust, achievable performance as might be measured by block error rate performance metrics.

Any matrix of dimensions N×L, for example where N is the number of samples in a symbol and L is the channel impulse response (CIR) length, can be decomposed into the product of two or more matrices with special and desirable properties. The best-known decompositions, which also offer good numerical stability, are the QR and SV (singular value) decompositions. A QR decomposition factors a matrix into a product of an orthogonal matrix Q and an upper triangular matrix R. Presently preferred implementations perform matrix decomposition on the time domain convolution matrix S as part of identifying diversity.

Particularly preferred implementations use a QR matrix decomposition because the inventor has observed that it provides better performance for OFDM signals. Assuming that the channel does not exceed L coefficients and assuming N samples in the received symbol, then the Q-matrix is N×N and the R-matrix is L×L. Preferred strategies employ reduced-dimension QR decomposition, so that only the first L columns of the Q-matrix need to be determined.

If EQ. 2 is extended to have two sources and an aggregate noise vector that may contain unknown interferers, then the signal y received by the receiver can be written as:

$$y=S_1h_1+S_2h_2+n. \quad \text{EQ. 3}$$

A preferred interference mitigation strategy for blind interference cancellation implements a projection matrix to keep the coordinates that are most significant to the SOI (the SOI is identified with index "1" in EQ. 3). In this discussion the index "2" identifies a non-SOI signal, such as from an interfering second transmitter. The first step of the analysis focuses on the part of the SOI that is in part known by the receiver, which may be a pilot or training symbol for the SOI.

For the pilot-only symbol $y_{ce}$ in FIG. 2, the receiver can generate the $S_1$ matrix from standards or other information known to the receiver, while $S_2$ remains unknown. A preferred strategy to reduce interference in the pilot only (or training only) symbol is to define a projection matrix $B_p$ such that it projects the signals into the direction of the pilot only signal. Applying the projection matrix provides, $$B_p y_{ce} = B_p S_1 h_1 + B_p S_2 h_2 + B_p n \quad \text{EQ. 4}$$
$$= B_p Q_1 R_1 h_1 + B_p Q_2 R_2 h_2 + \hat{n}.$$
$$= \tilde{Q}_1 \tilde{b}_1 + \tilde{Q}_1 \tilde{b}_2 + \hat{n}$$

In EQ. 4, $S_1$ and $S_2$ are subject to QR decomposition (second line) and the matrices are rewritten in the projected (SOI) coordinates (third line). All that remains are the signal components in the same coordinates as the SOI. This is a procedure that determines the vector 103 in FIG. 1 and the preferred projection direction, since the receiver does not know the characteristic parameters identifying the interferer. The vectors $b_i$ are the coordinates in the selected basis $\tilde{Q}_i$ for each signal indexed by i. In the case of the SOI, $$b_1=R_1h_1, \quad \text{EQ. 5}$$

and $$\tilde{Q}_1=[\tilde{q}_1 \, \tilde{q}_2 \ldots \tilde{q}_K]. \quad \text{EQ. 6}$$

Preferably K is much less than the channel length L, and indexing selects the columns of $Q_1$ with a preferred strategy that maximizes the fidelity of the SOI. That is, a preferred procedure chooses K columns out of the L columns in $Q_1$, and qk=qj for some $1 \leq j \leq N$ as k=1, 2, 3 . . . , K. The columns selected are not duplicated. Then, the value of K is selected on the basis of an error measure, such as $$e_{SOI} = \min_K \|Q_1 b_1 - \tilde{Q}_1 \tilde{b}_1\|^2. \quad \text{EQ. 7}$$

The EQ. 7 error measure preferably is minimized sufficiently with a value of K so that a performance metric, such as the symbol error rate, is unaffected or substantially unaffected by higher values of K. $\tilde{b}_1$ is the corresponding $k^{th}$ term $b_k$ in $b_1$ for the K selected columns $q_k$ in $Q_1$.

The properties stated as desired for $Q_1$, and detailed in the preferred embodiment, are obtained from the QR decomposition of S. This is true for any modulation or transmission of a signal through a channel due to the basic structure of the linear system described by EQ. 2.

In a preferred implementation, the vectors used to construct the projection matrix $B_p$ preferably are derived from the QR decomposition of a given matrix S. The matrix $Q_1$, obtained from the QR decomposition of S, can be used to construct $B_p$ via $\tilde{Q}_1$ (as in EQ. 6 and EQ. 7) in the following manner:

$$B_p = I - \tilde{Q}_1 \tilde{Q}_1^H \quad \text{EQ. 8}$$

which is most efficiently applied to any vector y as $$\begin{aligned} B_p y &= \tilde{Q}_1 \tilde{Q}_1^H y \\ &= \tilde{Q}_1 (\tilde{Q}_1^H y) \\ &= \tilde{Q}_1 c \\ &= \hat{y} \end{aligned} \quad \text{EQ. 9}$$

which has the desired result of expressing any vector, or matrix columns, in terms of the basis $\tilde{Q}_1$. Since the QR decomposition insures that Q is unitary, that is $Q^H Q = I$, EQ. 9 shows that $\tilde{Q}_1$ is an orthonormal basis.

Preferred interference cancellation methods can also be explained heuristically as exploiting diversity in the channel and transmission training symbol against the unknown interferers. Preferably the incoming symbol is compressed and more preferably the incoming signal is compressed with a basis, $\tilde{Q}_1$, that limits and in preferred implementations minimizes the energy orthogonal to the more significant basis vectors of the SOI. The compression can be described as, $$c = \tilde{Q}_1^H y, \quad \text{EQ. 10}$$

which is from EQ. 9. This operation projects a symbol y into the basis of the vectors in $\tilde{Q}_1$. The vector c can be referred to as the coordinates of y in $\tilde{Q}_1$. As shown in EQ. 6, $\tilde{Q}_1$ is defined to have K columns, with K much smaller than L and N, which shows that the representation of y in $\tilde{Q}_1$ is compressed. This is a lossy compression. The decompression, or approximation to y, is given by $$\hat{y} = \tilde{Q}_1 c. \quad \text{EQ. 11}$$

Because $\tilde{Q}_1$ is a unitary matrix, $\tilde{Q}_1$ can serve as the compression and decompression basis. This is not always the case.

Equations EQ. 10 and EQ. 11 demonstrate that the selection of K column vectors for $\tilde{Q}_1$ in the described manner can provide significant advantages. Particularly preferred implementations rank the columns of $Q_1$ such that the best K columns are selected for the most effective symbol compression.

Figure 3:
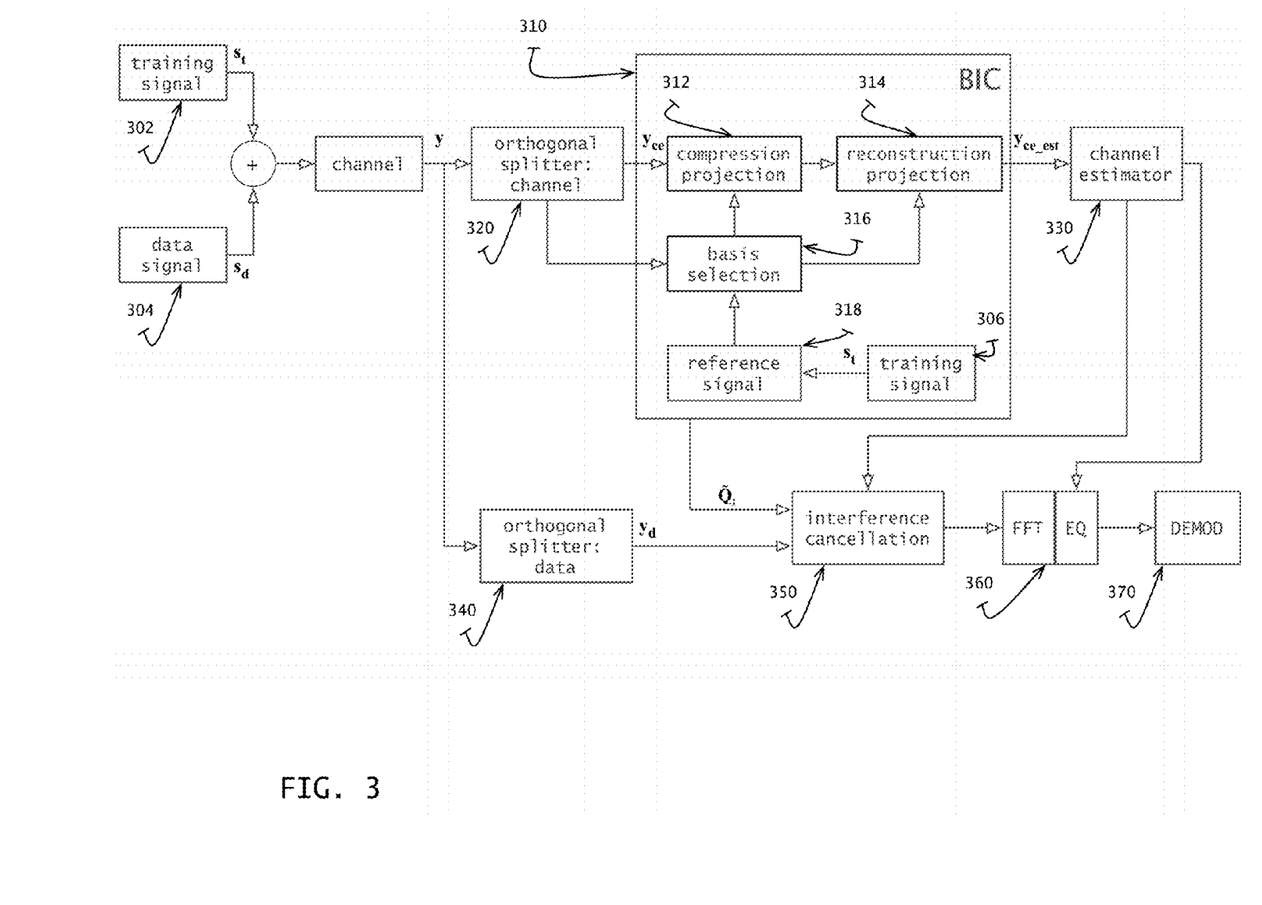
FIG. 3 illustrates a preferred system and method to effect blind interference cancellation for time domain channel estimation by applying compression and reconstruction to the channel estimator output.
Figure 6:
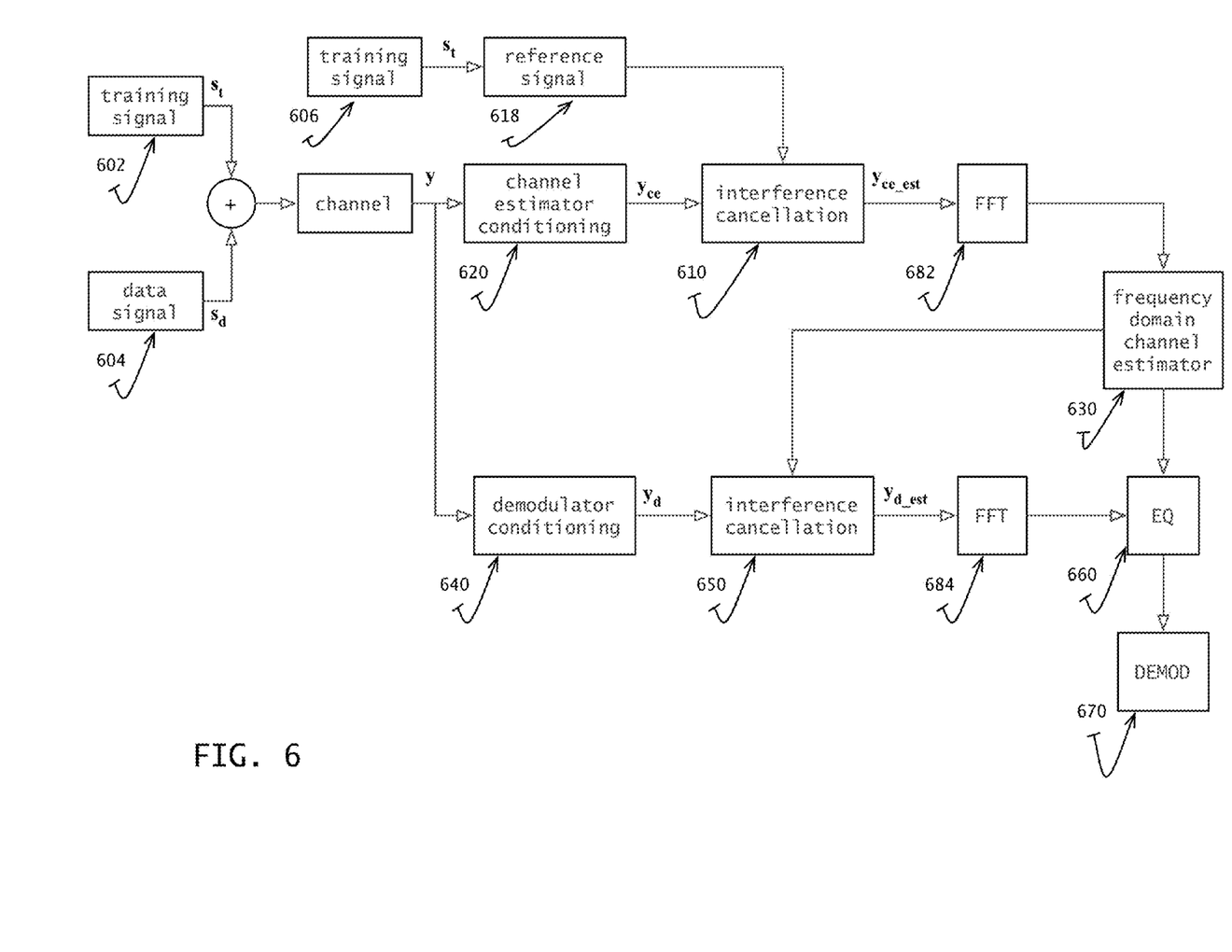
FIG. 6 illustrates a preferred system and method for interference cancellation for OFDM signals with known or unknown interferers as a two-part sequential approach with a frequency domain channel estimator interference canceller followed by a data signal interference canceller.

FIG. 3 is a top-level functional block diagram of a preferred method for interference cancellation applied as a two-step process at a receiver. The FIG. 3 receiver has a number of components similar to those discussed above in FIG. 2 and the discussion of those components is abbreviated or omitted with respect to FIG. 3. The communication system is assumed to use an N-sample symbol with orthogonal components, for example either as codes or carriers, which are split into two (pilot and data) components at the receiver via splitters 320 and 340. FIG. 3 details how blind interference cancellation is applied to $y_{ce}$ prior to time domain channel estimation in an OFDM receiver, although the receiver can be implemented to use frequency domain channel estimation, as illustrated in FIG. 6, as an alternative to the system illustrated in the circuit of FIG. 2.

Blind interference cancellation (BIC) module 310 receives the channel information from the channel splitter 320. The compression projection 312 preferably implements EQ. 10, which uses a reduced basis of K vectors to compress the symbol from N to K samples. Basis selection module 316 is responsive to the construction of the $S_1$ matrix by the reference signal 318 element. The information for constructing $S_1$ is available at the receiver 306 at the time of the symbol's reception. Basis selection module 316 preferably determines the QR decomposition of $S_1$, and ranks the column vectors of $Q_1$ to obtain K vectors as the basis used for the compression projection 312. The basis selection module 316 preferably implements EQS. 4 to 9 to achieve desired interference suppression performance. Subsequent to the reconstruction projection 314 preferably accomplished consistent with EQ. 11, the process of time domain channel estimation can proceed, for example as described in the previously incorporated U.S. patent application Ser. No. 13/416,990, "OFDM Receiver with Time Domain Channel Estimation."

Figure 4:
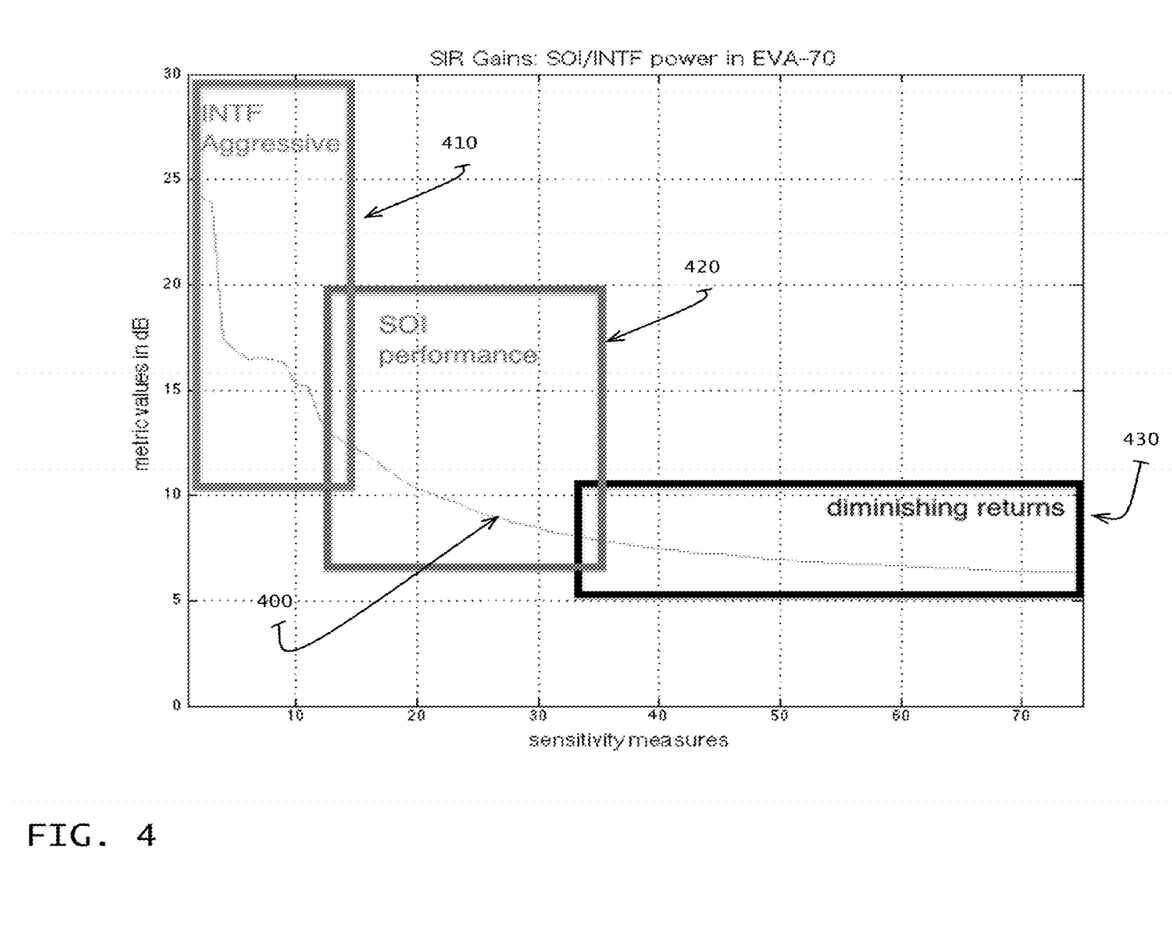
FIG. 4 illustrates the ratio of the signal of interest power to the interferer power for the received symbol as a function of the dimension value K.

FIG. 4 illustrates how the determination and use of a good K value provides improved performance for blind interference cancellation. The performance plot 400 shows the SOI-to-interference power ratio, measured at the output of blind interference canceller (BIC) 310, as a function of the value of $1 \le K \le L$, where L is the maximum channel estimation length to be estimated in the receiver. The FIG. 4 simulation uses L=100. For low values of K a region of aggressive interference cancellation 410 is highlighted, although in this region the error computed in EQ. 7 is significant enough to negatively affect the performance metric (e.g., symbol error rate). If the value of K is large, then the error in EQ. 7 is minimized, but so is the interference suppression and there is a region of diminishing return 430. There is a sensible range 420 of error reduction and modest interference suppression that does not affect the symbol error rate performance due to the error levels in the lossy compression and decompression of $y_{ce}$.

Figure 5:
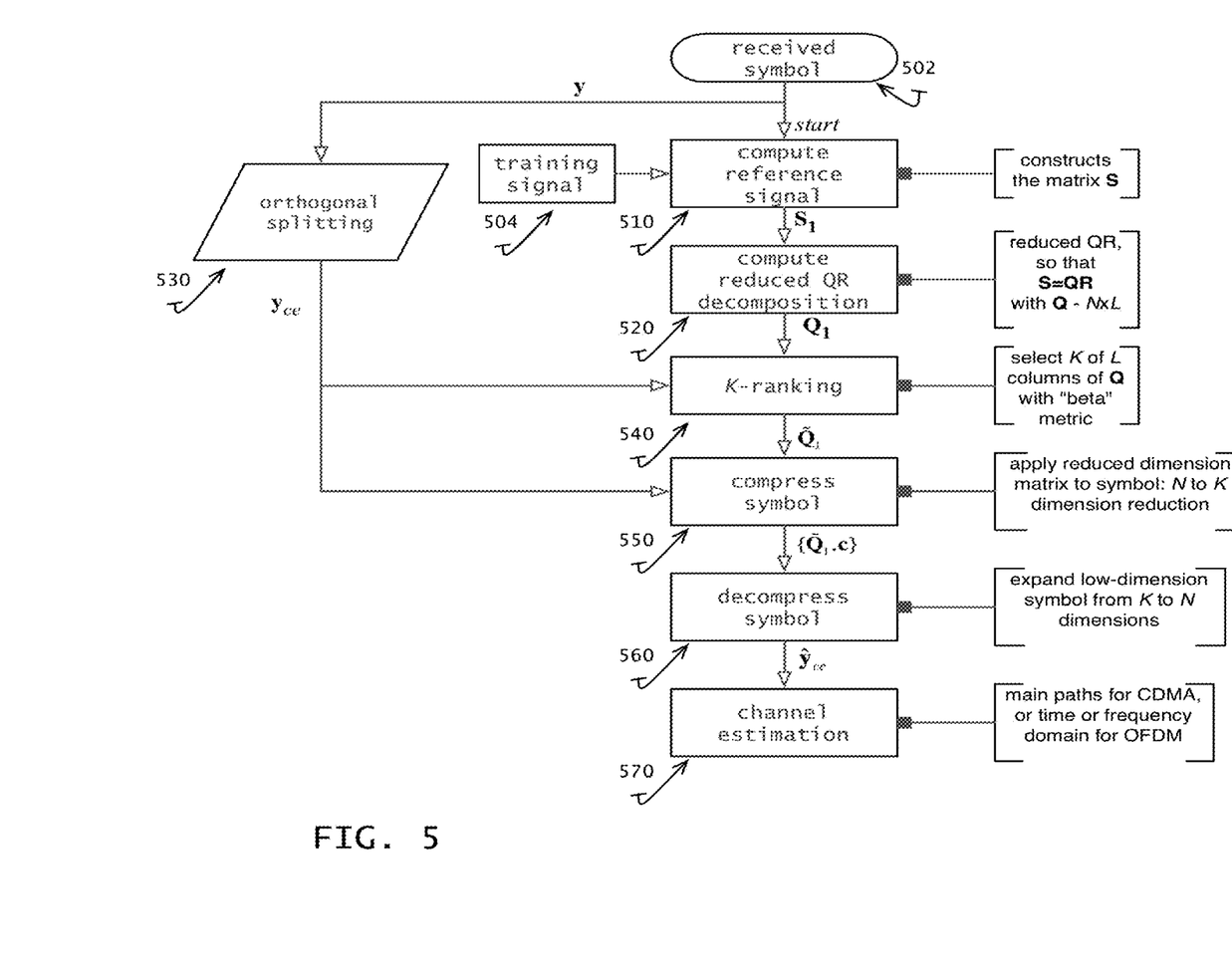
FIG. 5 is a flowchart illustrating a preferred system and method for interference cancellation in OFDM or CDMA systems with known or unknown interferers in the path of the training signal.

A preferred procedure for the BIC 310 functional block is illustrated in FIG. 5 as a flowchart. Equations EQ. 4 through EQ. 11 preferably are implemented in this illustrated procedure. Upon receiving a symbol's N samples 502, the receiver may begin assembling 510 the $S_1$ matrix. In fact, since the training signal 504 is known a priori, the receiver can begin assembling $S_1$ before the symbol is received. There are many strategies to apportion the computations in the illustrated procedure according to the details of a given standard and the availability of information to the receiver. The procedure preferably next obtains the $Q_1$ matrix 520 from $S_1$ via an algorithm or other procedure that identifies the first L columns of $Q_1$ given $S_1$. Orthogonal splitting 530 is applied to the input symbol to extract an orthogonal component from the received symbol such as, for example, the transmitted training values $y_{ce}$. The K-ranking procedure 540 preferably uses $y_{ce}$ and $Q_1$. The beta vector set out below can provide a metric for ranking the columns of $Q_1$, $$\beta = Q_1^H y_{ce} \quad \text{EQ. 12}$$
$$= Q_1^H (Q_1 R_1 h_1 + n)$$
$$= R_1 h_1 + Q_1^H n$$
$$= R_1 h_1 + z.$$

Here, the interference and noise is captured in the vector n, and the unitary-matrix property of $Q_1$ simplifies the transparency of $R_1 h_1$. Since the non-zero entries of $h_1$ are sparse, the beta-metric vector reflects this property by $h_1$ weighting just a few columns of the upper-triagonal matrix R. Thus $R_1 h_1$ has information on the location of the significant paths in the channel.

The receiver might use various strategies for processing such information to select the K best columns of $Q_1$ that will form $\tilde{Q}_1$ in the K-ranking 540 procedure. For example, the beta-metric vector can be sorted by the magnitude of its entries to reflect the order of the $Q_1$ columns, followed by selecting the first K columns. What remains in the preferred procedure is to compress $y_{ce}$, obtain the coordinates in the compression basis c, and reconstruct from c in the preferred basis, which is again $\tilde{Q}_1$. This is stated in equations EQ. 10 and EQ. 11 that preferably are implemented in modules 550 and 560. Finally, the channel estimation 570, for OFDM, can be determined with lower interference, for example using the procedures and apparatus described in the previously incorporated U.S. patent application Ser. No. 13/416,990, filed Mar. 9, 2012, "OFDM Receiver with Time Domain Channel Estimation." In the case of CDMA, channel estimation 570 may include identifying paths with significant power to determine an initialization for the CDMA receiver's rake fingers.

As can be seen from this discussion, the receiver's performance will also be determined by the properties of the S matrix. It is advantageous for this matrix to be full-rank, a terminology in linear algebra that heuristically relates to the richness of the information contained in the columns, or rows, of S. In some practical situations, preferred implementations may need to improve the properties of S to provide acceptable performance.

A preferred implementation of a receiver is responsive to a vector of samples comprising an OFDM symbol in the time domain (y). The receiver preferably is also responsive to information known a priori about the present symbol such as, for example, the pilot and the data frequencies. The reference signal generator 218 preferably uses this pilot and data frequency information to prepare its output. The reference signal generator module 218 locally recreates a pilot-only symbol and a sensible data-only symbol with properties suitable for interference mitigation and channel estimation.

In the case of OFDM waveforms, there may be instances where the ratio of the number of pilots to the total samples in the symbol may be quite small. In this case, the A matrix defined as $$A = S^H S \quad \text{EQ. 13}$$

may be ill-conditioned. Having a full-rank matrix is preferred for time-domain channel estimation because the accuracy of estimation can be reduced if the A-matrix does not have a good condition number. Since S is formed with pilots, the local reference signal preferably is augmented with virtual pilots (VP) to increase stability. As the term implies, virtual pilots do not exist in the incoming symbol as pilots but are instead preferably added to the signal or a processed version of the signal. Depending on the application and the relevant wireless standard, there are many strategies to determine which frequencies should have virtual pilots and the values those virtual pilots should have. For example, the receiver may determine pilot modulation values and locations using interpolation.

Referring again to FIG. 2, the received signal vector y preferably is conditioned to provide a desirable signal for time domain channel estimation. Preferred implementations include a received signal orthogonal splitter module 220 to remove the frequencies in the symbol where the data or non-relevant pilots are located. The preferred orthogonal splitter module 220 is responsive to the received OFDM symbol, is time aligned to the OFDM symbol and outputs a pilot-only version of this symbol. This is tantamount to "comb-filtering" the input symbol to keep the desired pilot frequencies. This comb-filtered, pilot-only received signal is labeled $y_p$ in FIG. 2. The locations of the pertinent pilot frequencies are known to the receiver and synchronized with the interference cancellation device, thus ensuring that the receiver can perform the desired comb-filtering.

Preferably the FIG. 2 implementation includes a virtual pilot (VP) interpolation module 224 to determine additional virtual pilot frequencies and output values for the reference signal generator 218 and for the comb-filtered signal $y_p$ that is output by splitter module 220. The VP interpolation module 224 responds to the information known a priori about the current symbol's pilot frequencies as well as the comb-filtered input symbol vector, output by the orthogonal splitter module 220. The inputs to module 210 preferably consist of the reference signal with added virtual pilots, and a comb-filtered received signal (from module 218) which now contains interpolated virtual pilots to match those of the reference signal. Preferred embodiments of the present invention include a particularly preferred interpolation of the comb-filtered signal labeled $y_p$ (in FIG. 2) based on Wiener filtering provided certain metrics are available, such as a doppler estimate, in generating the virtual pilot information.

When all interference is unknown, the receiver preferably uses a locally constructed reference signal, preferably including virtual pilots from module 230, to determine a projection matrix for the SOI. That is, Qp matrix generation module 250 preferably performs QR decomposition of the S matrix according to the reference signal, and proceeds to construct the Qp matrix in accordance with EQ. 8 and preferably with the ranking implied in EQ. 9.

Interference in the information bearing signal output by splitter 240, labeled as $y_d$ in FIG. 2, has not yet been removed and further processing is needed that mirrors the processing discussed above for $y_{ce}$. The reference signal generator module 218 preferably produces a reference symbol facsimile with the known pilot frequencies and modulations and preferably virtual pilot frequencies and modulations as generated by module 224. However, there is no corresponding mechanism to generate the equivalent S-matrix for the $y_d$ signal. Instead, the interference cancellation module 250 is responsive to the $y_d$ signal, is advantageously responsive to the channel estimation from module 230 and, as desired, other parameters estimated in accordance with the channel estimation strategy. Interference cancellation module 250 is preferably further responsive to the $Q_1$ compression matrix. EQS. 1 and 2 show that the H matrix can be used to effect a QR decomposition under the same assumptions that apply to the S matrix. In the formulation of EQ. 1, the channel is known, and the vector s is unknown, which is the case for the orthogonal data path of the symbol.

A number of strategies are available to determine the QR decomposition given the specifics for the wireless standard for which the receiver is designed, the choice between OFDM and CDMA waveforms, and the computational allowance at the receiver. In the case of a time domain channel estimator, as in FIG. 2 and FIG. 3, the additional parameters and information about the channel conditions may facilitate further strategies to improve performance.

Figure 7:
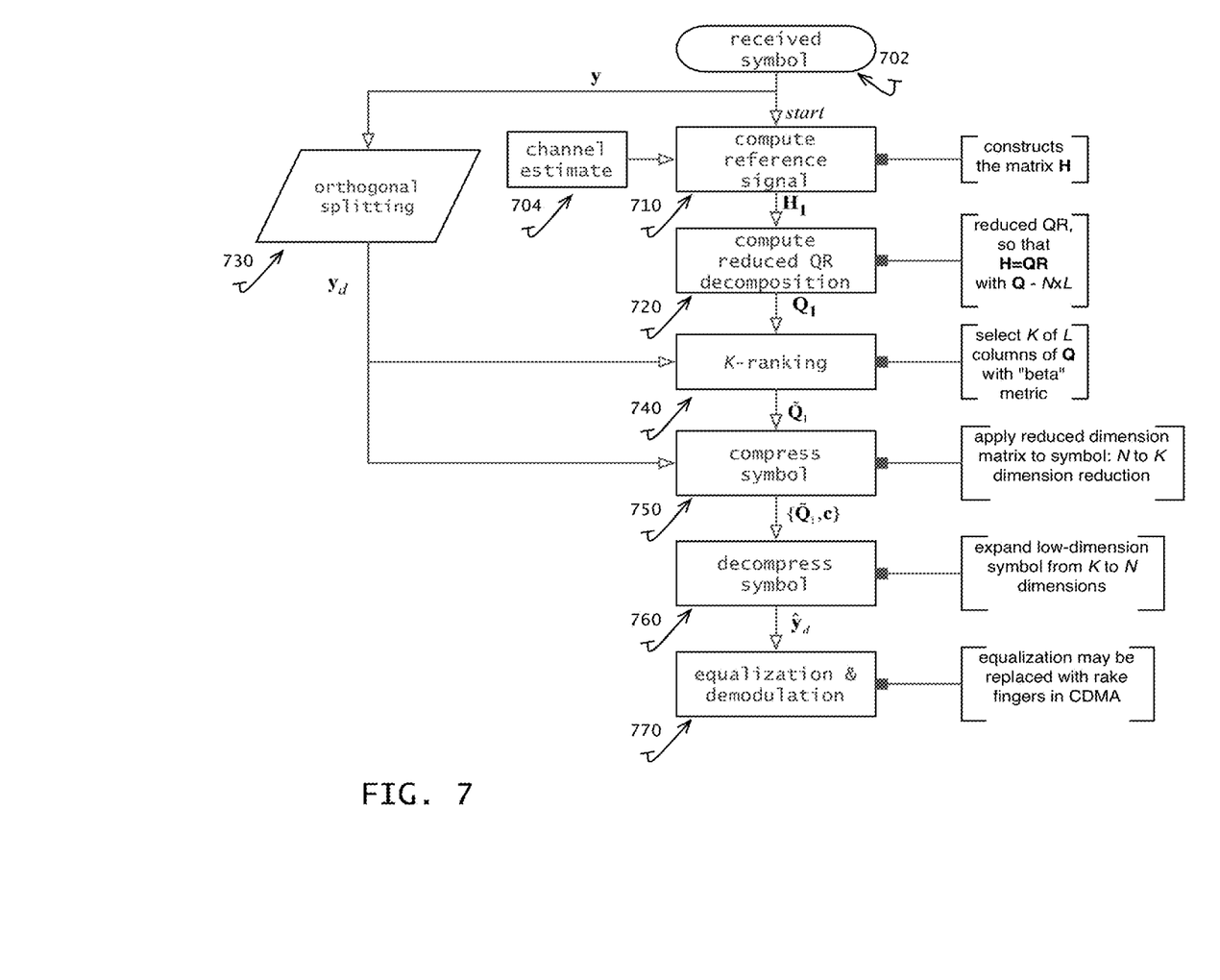
FIG. 7 is a flowchart illustrating a preferred system and method for interference cancellation in OFDM or CDMA systems with known or unknown interferers in the path of the training signal.

FIG. 7 illustrates how a procedure similar to that used for the interference cancellation of $y_{ce}$ can be applied to the data symbol $y_d$. In this illustrative implementation, the orthogonal splitting 730 provides the orthogonal symbol $y_d$, and the reference signal 710 is based on channel estimation. Otherwise, the procedure is the same, and EQ. 4 to EQ. 11 apply in the same manner by operating on the H matrix as they did with the S matrix in FIG. 5. Given the increased number of parameters estimated if the preferred method for channel estimation in the time domain is used, the K-ranking procedure 740 may advantageously utilize this additional information, depending on the details of the wireless standard for which the receiver is designed.

FIG. 3 further illustrates the processing for the interference cancellation device outputs. More specifically, FIG. 3 illustrates the components for subsequent processing preferably used in a time domain OFDM receiver, and FIG. 6 illustrates the components preferably used for subsequent processing in a frequency domain channel estimation OFDM receiver. For example, the time domain channel estimator module 330 is responsive to the interference mitigated pilot-only symbol, labeled as $y_{ce}$ in FIG. 3, the OFDM symbol and the S matrix constructed from the pilot-only reference signal. The time domain channel estimator module 330 preferably generates and outputs a frequency domain channel estimate that the receiver uses to equalize the input symbol.

A preferred receiver implementation uses a module 360 to equalize the signal vector, labeled as $y_d$ in FIG. 2 and FIG. 3, after the receiver transforms the signal vector to the frequency domain. Demodulator module 370 is preferably responsive to an interference mitigated equalized symbol, where the equalizer is responsive to the interference mitigated symbol and a frequency-transformed time domain channel estimate. The equalizer in turn preferably is responsive to an interference mitigated pilot-only symbol and the pilot-only reference signal that preferably contains virtual pilots.

A similar framework applies to CDMA receivers as was shown for OFDM receivers. The major differences are: 1) virtual pilots generally are not used; 2) an equalizer is generally optional, as rake receivers are still dominant in the reception of CDMA signals in a multipath environment; and 3) the interference cancellation device has only one conditioned output. More specifically, preferred CDMA receivers construct the S matrix similarly, and the receiver executes QR decomposition as described for OFDM in FIG. 5 and FIG. 7.

An appropriate OFDM receiver for implementing the two path interference mitigation strategy also can be implemented using channel estimation in the frequency domain as illustrated in FIG. 6. An appropriate configuration is shown in FIG. 6, which shows training signal 602 and data signal 604 combined and transmitted over a channel to a receiver, where the received signal y is provided to the channel estimator conditioner 620 and the demodulator conditioner 640. Channel estimator conditioner 620 and demodulator conditioner 640 are symbol modifiers. Channel estimator conditioner 620 performs comb-filtering and puncturing of the symbol to leave the pilots. Demodulator conditioner 640 performs comb filtering and puncturing of the symbol to leave the data carriers intact. A further discussion of comb filtering and puncturing can be found in previously incorporated application Ser. No. 13/835,305, entitled "Block Time Domain Channel Estimation in OFDM System," filed Mar. 15, 2013 naming Steven C. Thompson and Fernando Lopez de Victoria as inventors.

The training signal memory 606 and reference signal module 618 are the same as the corresponding elements in FIG. 2. The training signal interference canceller 610 has similar functions to the interference canceller 210 of FIG. 2 and preferably implements the process flow shown in FIG. 5. The data signal interference canceller 650 has similar functions to the interference canceller 250 of FIG. 2 and preferably implements the process flow shown in FIG. 7. The interference mitigated training signal is transformed into the frequency domain by FFT 682 and the transformed signal is provided to the frequency domain channel estimator 630, which determines a channel estimate. OFDM frequency domain channel estimators are known and commercially available and so estimator 630 is not described in detail here. Interference canceller 250 outputs an interference mitigated symbol that is transformed by FFT 684 to the frequency domain and provided to equalizer 660. The FIG. 6 equalizer 660 and demodulator 670 are the same as the equalizer and demodulator 270 of FIG. 2.

The present invention has been described in terms of certain preferred embodiments. Those of ordinary skill in the art will appreciate that various modifications and alterations could be made to the specific preferred embodiments described here without varying from the teachings of the present invention. Consequently, the present invention is not intended to be limited to the specific preferred embodiments described here but instead the present invention is to be defined by the appended claims.

What is claimed is:

1. A method of communication in an OFDM system, the method comprising:
    receiving a signal comprising at least one OFDM symbol;
    extracting training information from the signal, wherein the training information is associated with the at least one OFDM symbol;
    performing interference mitigation using the extracted training information to produce reduced interference training information;
    performing channel estimation using at least the reduced interference training information to produce a channel estimate; and
    equalizing the at least one OFDM symbol using the channel estimate.

2. The method of claim 1, further comprising performing a second interference mitigation on at least a data portion of the OFDM symbol in response to the channel estimate.

3. The method of claim 2, wherein the second interference mitigation uses the channel estimate to generate a basis and, using the basis, performs lossy compression followed by decompression on at least a portion of the OFDM symbol.

4. The method of claim 2, wherein the second interference mitigation performs lossy compression on at least a portion of the at least one OFDM symbol using a basis generated from modulation information and later performs decompression on the at least a portion of the at least one OFDM symbol.

5. The method of claim 1, wherein the performing channel estimation uses only the reduced interference training information to produce a channel estimate.

6. The method of claim 2, further comprising performing a second interference mitigation on at least a data portion of the OFDM symbol in response to the channel estimate.

7. The method of claim 3, wherein the second interference mitigation uses the channel estimate to generate a basis and, using the basis, performs lossy compression followed by decompression on at least a portion of the OFDM symbol.

8. The method of claim 3, wherein the second interference mitigation performs lossy compression on at least a portion of the at least one OFDM symbol using a basis generated from modulation information and later performs decompression on the at least a portion of the at least one OFDM symbol.

9. A method for mitigating interference in an OFDM communication system, the method comprising:
identifying in an OFDM communication signal a diversity structure representative of differences in modulation between a signal of interest and at least one interfering signal;
mitigation processing at least a first portion of the OFDM communication signal to mitigate interference in the signal of interest, the mitigation processing using first information from the diversity structure to distinguish between the signal of interest and the at least one interfering signal and providing a mitigated signal;
estimating a channel over which the first portion of the OFDM communication signal traveled to provide a channel estimate;
performing further mitigation processing on a second portion of the OFDM communication signal, the further mitigation processing using second information about differences in modulation between the signal of interest and the at least one interfering signal to produce a mitigated second portion of the OFDM communication signal; and
demodulating the mitigated second portion of the OFDM communication signal using the channel estimate.

10. The method of claim 9, wherein the estimating a channel uses the mitigated signal to provide the channel estimate.

11. The method of claim 10, wherein the second information comprises the channel estimate.

12. The method of claim 9, wherein the first portion and the second portion of the OFDM communication signal do not overlap.

13. The method of claim 9, wherein the diversity structure is determined from transmitted pilots in an OFDM symbol.

14. The method of claim 9, wherein the identifying comprises providing a reference signal corresponding to a training signal and providing a reduced dimension basis corresponding to the reference signal and wherein the further mitigation processing uses the reduced dimension basis to project the second portion of the OFDM communication signal in a manner that provides a mitigated signal having reduced interference compared to the OFDM communication signal.

15. The method of claim 14, wherein the channel estimate is generated through time domain channel estimation.

16. The method of claim 14, wherein the reference signal comprises the time-domain convolution matrix for an OFDM training symbol.

17. The method of claim 14, wherein the providing a reduced dimension basis comprises performing QR matrix decomposition.

18. The method of claim 17, wherein the QR matrix decomposition is performed on a time-domain convolution matrix corresponding to at least a portion of the signal of interest.

19. The method of claim 18, wherein the signal of interest includes an OFDM symbol.

20. The method of claim 14, further comprising adding virtual pilots to the reference signal prior to mitigation processing.

21. The method of claim 20, wherein the first portion of the OFDM communication signal comprises pilot signals from an OFDM symbol.

22. The method of claim 14, wherein the further mitigation processing comprises projecting the second portion of the OFDM communication signal using the reduced dimension basis prior to demodulating the mitigated second portion of the OFDM communication signal.

23. The method of claim 22, wherein the estimating a channel comprises time domain channel estimation.

24. The method of claim 14, wherein a number of basis vectors in a reduced dimension basis is selected at least in part to achieve a level of interference suppression.

25. The method of claim 9, wherein the mitigation processing at least the first portion of the OFDM communication signal comprises decomposing a time-domain convolution matrix corresponding to a signal of interest to provide vectors defining a first basis, ranking the vectors defining the first basis, and selecting from the first basis a reduced basis on the basis of ranking, the reduced basis to be used for mitigation processing.

26. The method of claim 25, wherein a number of vectors in the reduced basis is selected at least in part to achieve a level of interference suppression.

27. The method of claim 9, wherein further mitigation processing the second portion of the OFDM communication signal comprises decomposing a time-domain convolution matrix corresponding to a signal of interest to provide vectors defining a first basis, ranking the vectors defining the first basis, and selecting from the first basis a reduced basis on the basis of ranking, the reduced basis to be used for mitigation processing.

28. The method of claim 9, wherein the first portion of the OFDM communication signal is separated from the second portion of the OFDM communication signal before mitigation processing.

29. The method of claim 27, wherein after separating the first portion of the OFDM communication signal from the second portion of the OFDM communication signal, comb filtering the first portion to leave pilot signals.

* * * * *